United States Patent [19]

Fish

[11] 3,926,059

[45] Dec. 16, 1975

[54] ACCELEROMETER

[76] Inventor: Vernon R. Fish, 525 Meadowbrook Ave., Orange, Calif. 92665

[22] Filed: Apr. 15, 1974

[21] Appl. No.: 460,993

Related U.S. Application Data

[62] Division of Ser. No. 277,676, Aug. 3, 1972, Pat. No. 3,804,471.

[52] U.S. Cl. .................................... 73/510; 73/515
[51] Int. Cl.² ......................................... G01P 15/02
[58] Field of Search .......... 73/505, 515, 516 R, 510, 73/514, 517 A, 517 R

[56] References Cited
UNITED STATES PATENTS

| | | | |
|---|---|---|---|
| 2,365,218 | 12/1944 | Rogers | 73/71.4 |
| 2,498,118 | 2/1950 | Weiss | 73/505 |
| 3,085,443 | 4/1963 | Manteuffel | 73/505 |
| 3,540,268 | 11/1970 | Kantola et al. | 73/515 X |
| 3,541,865 | 11/1970 | Brown | 73/515 |
| 3,768,374 | 10/1973 | Shin Ito et al. | 73/515 X |

FOREIGN PATENTS OR APPLICATIONS 1,054,646  10/1953  France .............. 73/517 A Primary Examiner—James J. Gill
Attorney, Agent, or Firm—Gausewitz, Carr & Rothenberg

[57] ABSTRACT

An antiskid braking system which includes valve means for controlling the application of operating pressure to the brakes, so as to rapidly release and then more gradually allow application of the brakes when a skid is indicated, the valve means being operated by the output of a fluid amplifier means which, in turn, is operated by signals from a linear accelerometer that moves in the path of the vehicle and an angular accelerometer that rotates with the wheel, each accelerometer including a seismic mass positioned by impinging fluid discharged from an adjacent outlet and relatively movable to vary the restriction of the fluid discharged to produce signals indicating acceleration and deceleration.

1 Claim, 9 Drawing Figures

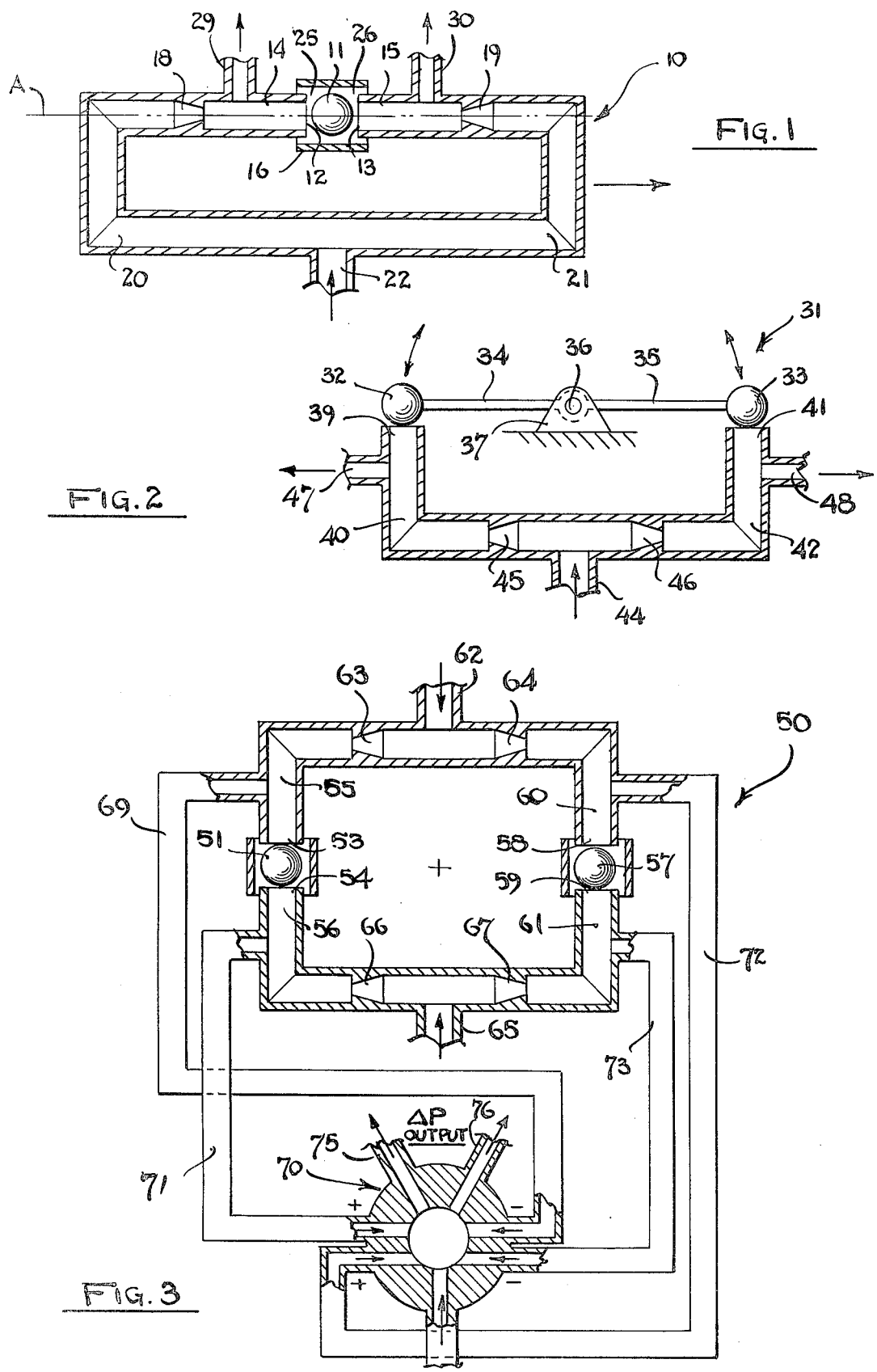

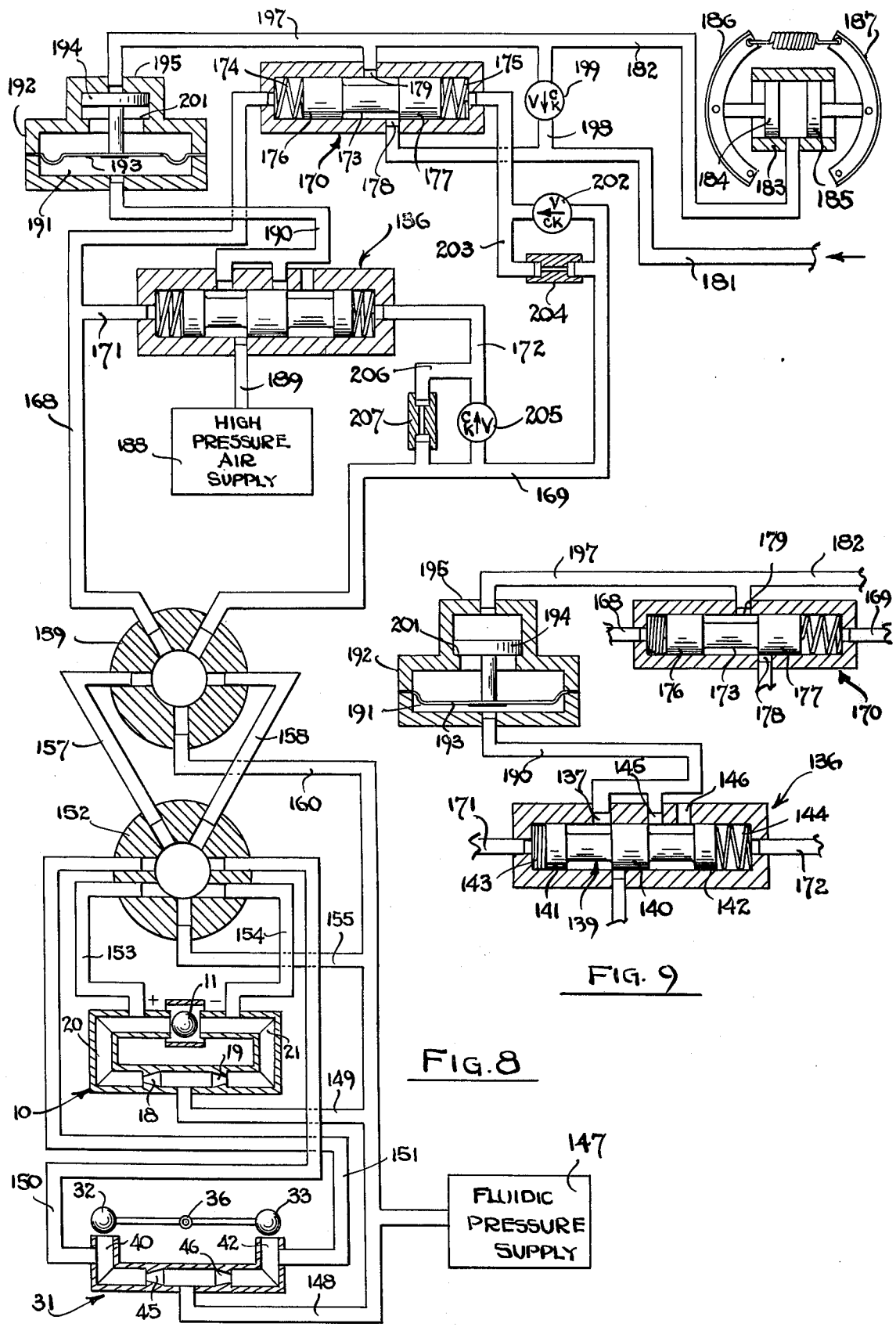

ACCELEROMETER

This is a division of application Ser. No. 277,676, filed Aug. 3, 1972, now U.S. Pat. No. 3,804,471.

BACKGROUND OF THE INVENTION

1. Field of the Invention

This invention relates to an accelerometer and antiskid braking system.

2. Description of Prior Art

There has been an increasing recognition of the importance of antiskid braking systems for vehicles, such as trucks and automobiles. Several of such systems have been designed, but they have not achieved widespread acceptance. The antiskid devices which have been made available for purchase operate through complex electronic feedback circuits, and are sufficiently expensive to be prohibitive in cost for all but a minor segment of the market. Also, some of these units detract from the maximum braking effect which otherwise would be obtainable for the vehicle. Maintenance problems and uncertain reliability also may be present with such prior units.

SUMMARY OF THE INVENTION

The present invention overcomes the difficulty of prior devices, resulting in an antiskid system which is economical to construct and fully reliable in its operation, while effectively accomplishing rapid vehicle deceleration. The system includes a linear accelerometer which is attached to the vehicle so as to travel in the path that the vehicle takes. There is, in addition, an angular accelerometer for each of the wheels of the vehicle for which skid control is to be provided.

The linear accelerometer includes a seismic mass, which may be a sphere which is positioned between two opposed fluid streams, which conveniently are airstreams. Under conditions of constant velocity, the seismic mass will be equidistant between the two fluid outlets. However, if acceleration is experienced, one of the outlets will be moved closer to the seismic mass and the other will be separated from it by an equivalent amount. The result is an increase in static pressure in the discharge chamber upstream of the one fluid outlet and a corresponding decrease in pressure in the fluid chamber upstream of the other outlet. The difference between these two pressures is proportional to the amount of acceleration experienced.

The angular accelerometer may include a pair of seismic masses, such as spheres, at the ends of a rigid arm pivotally mounted at a point midway between the two masses. Each sphere is located adjacent a fluid outlet, the outlets being positioned to discharge with parallel streams which impinge upon the spheres. In the absence of angular acceleration, the fluid streams keep the spheres equidistant from the two fluid outlets, and the pressures in the discharge chambers are equal. Upon experiencing angular acceleration, however, one fluid outlet will be moved closer to its adjacent sphere and the other away from the adjacent sphere. The result is an increase in pressure in one discharge chamber and a decrease in pressure in the other. The differential is proportional to the amount of angular acceleration.

Alternatively, the spheres may be unconnected and each located between opposed fluid streams. When angular acceleration occurs, each sphere will move closer to one fluid outlet and farther away from the other. The pressures in the chambers which experience the pressure increase are added in a fluid amplifier and those in the other two chambers that experience the pressure decrease also are added in the amplifier. The two resulting pressures then are subtracted, giving a resulting pressure which is proportional to the applied angular acceleration.

The angular accelerometer also may include four spherical masses arranged in a generally square pattern, in which event two fluid amplifiers are used in appropriately adding pressure signals and subtracting others to obtain a resulting output proportional to angular acceleration.

In a vehicle braking system, such as one for pneumatic truck brakes, the signal from the angular accelerometer is subtracted from that of the linear accelerometer in a summing proportional fluid amplifier. The resulting signal is applied to the inputs of a digital fluid amplifier. The output of the latter device is applied across either end of a control valve. This valve is in the line that conducts pressurized air, as directed by the brake pedal, to the actuating chamber for applying the brakes. In the event a skid commences, the signal from the angular accelerometer will greatly exceed that from the linear accelerometer. This causes the digital amplifier to become saturated, producing a signal which immediately shifts the control valve to a position where it blocks the pressure line from the brake pedal so that it no longer has access to the brakes. At the same time, it vents the brake actuator to atmosphere so that the brakes are released. Then, as the wheel accelerates, it produces an opposite signal from the digital amplifier, which moves the control valve in the opposite direction to permit the brakes to be reapplied. The latter movement, through a check valve and restrictor, is controlled so that brakes are applied more gradually than they are released. The cycle is repeated rapidly as long as the wheel tends to skid, as the brakes are continually applied and then released, which effectively slows down the vehicle while preventing a skid.

The same arrangement of accelerometers and amplifier is used in conjunction with a hydraulic brake system. In this event, the signal from the amplifier will move an additional control valve which blocks the application of hydraulic fluid to the wheel cylinder. At the same time, the air control valve is moved to vent an accumulator to atmosphere, which, in turn, permits fluid to be bled from the wheel cylinder into a chamber of the accumulator. The air valve is moved more rapidly back to its original position by the signal from the then accelerating wheel than is the hydraulic control valve. Accordingly, the accumulator becomes pressurized to return the hydraulic fluid to the wheel cylinder. The cycle repeats over and over so long as there is a tendency for the wheel to skid.

BRIEF DESCRIPTION OF THE DRAWING

FIG. 1 is a side elevational view, partially in section, of a linear accelerometer;

FIG. 2 is a side elevational view, partially in section, of an angular accelerometer;

FIG. 3 is a side elevational view, partially in section of a different embodiment of the angular accelerometer;

FIG. 8 is a schematic view of the antiskid system as used for each wheel in a hydraulic braking system; and FIG. 9 is a schematic view of a portion of the arrangement of FIG. 8, with certain parts in their alternate positions.

DESCRIPTION OF THE PREFERRED EMBODIMENTS

Figure 4:
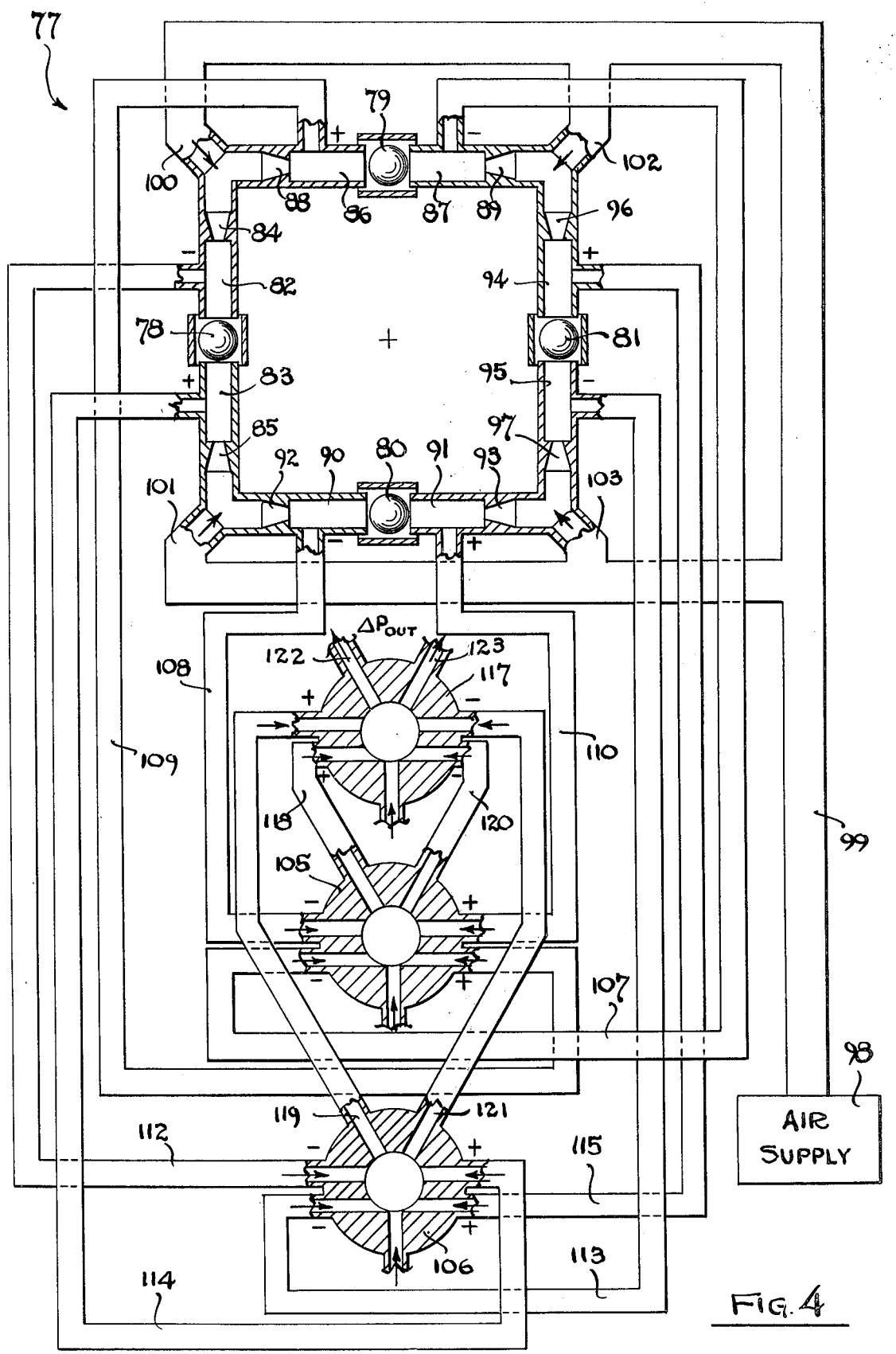
FIG. 4 is a side elevational view, partially in section, of a further embodiment of the angular accelerometer.

The braking system of this invention utilizes a combination of linear and angular accelerometers arranged such that the brakes of a vehicle will be released in the event a skid is detected, and then reapplied on a rapidly repeating cycle. The skid control prevents the locking of the wheels, continually limiting the braking force so that it cannot cause the wheels to slide.

A linear accelerometer for use in this invention is shown in FIG. 1. This accelerometer, like all accelerometers, operates on the principle of Newton's Second Law of Motion, that is, acceleration of a body is directly proportional to the net force producing the acceleration and inversely proportional to the mass. In the accelerometer 10 of FIG. 1, the mass is a sphere 11 of predetermined size and weight. The sphere 11 is positioned between two opposed axially aligned openings 12 and 13 of identical size, which allow fluid to discharge from chambers 14 and 15. The sphere 11 is dimensioned so that it is permitted to move a limited distance between the two outlets. A cage 16 is provided around the sphere 11 between the outlets 12 and 13, which limits the movement of the sphere 11 to a linear path between the two outlets. The sphere 11 cannot drop from its position between the outlets when the accelerometer is not in operation.

A pair of convergent fluid nozzles 18 and 19 communicates with the chambers 14 and 15, respectively. The nozzles 18 and 19 are supplied with fluid from passageways 20 and 21, which receive their fluid from an inlet 22.

The accelerometer 10, as well as the other accelerometers described below, operates effectively on air, which normally can be made available at a low cost, but any other fluid, such as hydraulic fluid, may be used as well. In the examples given, air will be indicated as the accelerometer fluid.

In operation of the accelerometer, air entering the inlet 22 is split to flow in equal volumes through the two passageways 20 and 21. From these, it discharges through the convergent nozzles 18 and 19 into the axially aligned cylindrical chambers 14 and 15. Air then flows outwardly through the discharge openings 12 and 13, impinging on opposite sides against the sphere 11. From there, the air escapes through the spaces 25 and 26 between the edges of the openings 12 and 13 and the periphery of the sphere 11. The parts are proportioned such that each air escape area is less than the area at the adjacent outlet opening. In other words, the cross-sectional area of the space 25 is less than that of the outlet opening 12, and the area of the space 26 is not as great as that of the outlet 13. As a result, the two fluid streams are restricted at the locations where they escape around the sphere 11.

Under normal conditions, such as when the accelerometer 10 is moving at a constant velocity, there will be equal flows of air through the outlets 12 and 13, and the sphere 11 will be suspended by the opposing streams midway between the two outlets. At this time, the pressure taps 29 and 30 for the chambers 14 and 15 will indicate the same static pressure for the two chambers.

In the event that the accelerometer 10 should experience acceleration in the direction of the axis A of the chambers 14 and 15, and their outlets 12 and 13, the sphere 11 will move toward one of the outlets and away from the other. The sphere 11 will tend to continue its movement at a constant velocity, having no direct connection to the other components of the accelerometer which experience the acceleration. Therefore, the body of the accelerometer will move relative to the spherical mass 11, bringing the outlet 12 or the outlet 13 closer to the sphere. In the event the linear acceleration of the accelerometer 10 is in the direction of the arrow, i.e., to the right as the device is shown in FIG. 1, the outlet 12 will move toward the sphere 11, while the outlet 13 is shifted away from the sphere. The result is an increased restriction at the outlet 12 and less restriction at the outlet 13. Consequently, the pressure in the chamber 14 rises, while the pressure in the chamber 15 drops. The difference in these pressures, which can be detected at the pressure taps 29 and 30, is directly proportional to the amount of acceleration of the accelerometer. Therefore, acceleration can be computed upon reading the pressures in the taps 29 and 30 and subtracting one from the other. Also, the pressure taps 29 and 30 can provide a usable output signal proportional to acceleration, which can operate other devices in a system.

Deceleration is indicated in the same manner that acceleration is shown. Assuming movement in the direction of the arrow in FIG. 1, deceleration of the accelerometer will bring the sphere 11 closer to the outlet 13 and away from the outlet 12 as the sphere tends to continue at a constant velocity. The pressure then rises in the chamber 15 and falls in the chamber 14, with the difference being proportional to the rate of deceleration.

For indicating angular acceleration, the device may take the form shown in FIG. 2. Here the accelerometer 31 has two identical spheres 32 and 33 of known mass and size mounted on arms 34 and 35, respectively, which are of equal length and axially aligned. The rods are attached to a shaft 36 which is pivotally mounted on brackets 37 so as to be rotatable about an axis perpendicular to the arms 34 and 35. The sphere 32 is positioned adjacent the outlet 39 of a fluid chamber 40, while similarly the sphere 33 is located next to the outlet 41 of a fluid chamber 42. The outlets 39 and 41 fall in the same plane, and the chambers 40 and 42 are parallel so as to discharge airstreams that are perpendicular to extensions of the axes of the arms 34 and 35.

Pressurized air for the chambers 40 and 42 is supplied through an inlet tee 44, where it is divided equally and discharged through convergent nozzles 45 and 46 into the chambers 40 and 42. This provides equal airflows through the outlets 39 and 41 so that equal forces are applied to the spheres 32 and 33. Consequently, the spheres 32 and 33 are held equidistant from their respective fluid outlets 39 and 41. Equal pressures then are realized in the chambers 40 and 42 and can be measured at the pressure taps 47 and 48.

In the event of an angular acceleration of the accelerometer 31 about an axis coincident with, or parallel to, the shaft 36 that mounts the arms 34 and 35, one fluid outlet will be moved toward its adjacent sphere, and the other will move away from its adjacent sphere, as relative rotation occurs about the shaft 36. For angular acceleration in the clockwise direction, as the device is shown in FIG. 2, the relative movement will bring the fluid outlet 39 closer to the sphere 32. A corresponding movement of the fluid outlet 41 away from the sphere 33 also occurs. The increased restriction at the outlet 39 causes the pressure in the chamber 40 to increase. Similarly, the decreased restriction at the outlet 41 allows the fluid to discharge more freely from that opening, so that the pressure is reduced in the chamber 42. A differential pressure signal then is indicated by the two pressure taps 47 and 48. This pressure difference is directly proportional to the angular acceleration of the unit.

Deceleration produces the opposite relative movement between the spherical mass and its adjacent fluid outlet, again generating a pressure differential in the chambers 40 and 42. The difference in pressure is directly proportional to the rate of deceleration.

Linear acceleration does not affect the accelerometer 31 as the forces then imposed cancel out so as to produce no relative movement between the spheres 32 and 33 and the body of the accelerometer. The linear accelerating forces may be resolved into components in the direction of the axes of the arms 34 and 35, and normal thereto. The former force components cannot influence the positions of the spheres 32 and 33 because of their connections to the arms 34 and 35. The force components normal to the axes of these arms are the same for each sphere and so cannot cause the arms to rotate.

Another form of angular accelerometer 50 is shown in FIG. 3. This accelerometer, which may be considered as falling in a single plane, includes a spherical mass 51 positioned between axially aligned opposed fluid outlets 53 and 54, which discharge from chambers 55 and 56. A matching sphere 57 is between a second pair of aligned fluid outlets 58 and 59, which discharge fluid from chambers 60 and 61, respectively. The axes of the two sets of fluid outlets are parallel, and the spheres 51 and 57 are at opposite locations. Fluid for the chambers 55 and 60 is supplied from an inlet tee 62, and discharged through converging nozzles 63 and 64 in opposite directions and equal volumes into the chambers 55 and 60. A corresponding inlet 65 receives fluid at the same pressure, discharging it equally through converging nozzles 66 and 67 to enter the chambers 56 and 61. Consequently, under constant velocity conditions, the masses 51 and 57 are suspended by opposing fluid streams midway between their adjacent fluid outlets.

A line 69 extends from the chamber 55 to one side (the right, as illustrated) of a two-input summing fluid amplifier 70. This applies the static pressure of the chamber 55 to one input of the fluid amplifier 70. A pressure line 71 for the chamber 56 also is connected to the amplifier 70, providing an input opposite from the pressure line 69. The pressures in the chambers 60 and 61 also provide opposing inputs to the amplifier 70. The chamber 60 is connected through a line 72 to the amplifier 70 on the same side as that of the line 71. This is in opposition to the pressure input from the line 73 that extends to the amplifier from the chamber 61.

With this arrangement, the pressures in the chambers 56 and 60 are added, the pressures in the chambers 55 and 61 are added, and the two resulting pressures are subtracted. This produces a differential pressure at the output taps 75 and 76 of the amplifier which is proportional to the difference of the two input differential pressures.

If an angular acceleration is experienced about an axis perpendicular to the plane of the accelerometer 50, one of each set of fluid outlets will be moved toward its adjacent spherical mass, and the other fluid outlet will move away from the spherical mass. As before, the pressure in one of each pair of opposed chambers will rise because of an increased restriction at its outlet, while in the other chamber the pressure will be reduced because of less restriction at the outlet. For acceleration in the clockwise direction, as the accelerometer is shown in FIG. 3, the outlet 54 will be moved toward the sphere 51 and the outlet 53 will be moved away from it, raising the pressure in the chamber 56 and reducing it in the chamber 55. At the same time, the outlet 58 will shift toward the sphere 57 and the outlet 59 away from this sphere, increasing the pressure in the chamber 60, while it decreases in the chamber 61.

The signals from the two chambers 56 and 60, where the pressure is increased, are added by virtue of being connected to the same side of the amplifier 70. Similarly, the pressures of the two chambers 55 and 61, which decreased from the acceleration, are added by being connected to the opposite side of the amplifier 70. The resulting opposed pressures are subtracted in the amplifier 70, so that the differential pressure across the output pressure taps 75 and 76 is proportional to the applied angular acceleration.

Linear accelerations experienced by the accelerometer 50 cancel out and do not influence the output signal. For example, if there is linear acceleration vertically as the accelerometer is shown in FIG. 3, the outlet 54 will be urged toward the sphere 51 and a similar tendency will be felt toward moving the outlet 59 toward the sphere 57. The result is to increase the pressure differential between the chambers 55 and 56, and to decrease the pressure differential between the chambers 60 and 61. These pressure changes are experienced on opposite sides of the fluid amplifier 70, hence being subtracted from each other and producing a zero difference in the amplifier output.

The angular accelerometer 77, illustrated in FIG. 4, includes four spherical masses 78, 79, 80 and 81. The accelerometer is in a square pattern, essentially in a single plane, with these spherical masses being at the midpoints of the four sides. The mass 78 is intermediate the outlets of chambers 82 and 83, which receive air from convergent nozzles 84 and 85, respectively. The sphere 79, located between chambers 86 and 87, is reacted upon by fluid discharged from nozzles 88 and 89. Chambers 90 and 91 are supplied with air from convergent nozzles 92 and 93, discharging it on opposite sides of the sphere 80. The final two chambers 94 and 95 similarly receive air from nozzles 96 and 97, respectively, which provides the opposing forces on the sphere 81. The air supply 98 connects through a line 99 to the four diagonal inlets 100, 101, 102 and 103 at the corners of the accelerometer. The air is split into two branches at each inlet, resulting in equal flows through all of the nozzles.

When the accelerometer 77 is subjected to angular acceleration about an axis perpendicular to the plane of the accelerometer, four of the outlet openings will become more restricted, while the other four will be opened up to result in pressure differences in adjacent air chambers. For clockwise acceleration, there will be relative movement of the chamber 83 toward the sphere 78, the chamber 86 toward the sphere 79, the chamber 91 toward the sphere 80, and the chamber 94 toward the sphere 81. As a result, pressure will increase in the chambers 83, 86, 91 and 94. A corresponding reduction in pressure will be experienced in the chambers 82, 87, 90 and 95.

Two two-input summing amplifiers 105 and 106 receive the pressure signals from the chambers of the accelerometer 77. In the arrangement shown, the signals from the chambers 87 and 90, on opposite sides of the accelerometer, are added, being connected through lines 107 and 108 to the left side of the amplifier 105. These two pressures are reduced by the clockwise acceleration of this example. On the opposite side of the amplifier 105, the signal from the chamber 86 is received through line 109 and that of the chamber 91 through line 110. These chambers, which experienced pressure increases from the acceleration, are opposed to the chambers 87 and 90.

In a similar manner, the other pressure chambers on the two remaining opposite sides of the accelerometer 77 are connected to the amplifier 106. Chamber 82, which had a decrease in pressure from acceleration, connects through line 112 to the left side of the amplifier 106, while chamber 95, which likewise lost pressure, through line 113 connects to the same side of the amplifier 106. On the opposite side of the amplifier 106, the chamber 83 is connected through a line 114, and the chamber 94 is connected through a line 115. The latter two chambers increased in pressure from the acceleration.

The output signals of the two amplifiers 105 and 106 are connected to a third two-input summing amplifier 117. Lines 118 and 119 connect one side of the amplifiers 105 and 106, respectively, to the same side of the amplifier 117. Lines 120 and 121 connect the opposite sides of the amplifiers 105 and 106 to the opposite side of the amplifier 117. The differential pressure then present across the outputs 122 and 123 of the amplifier 117 is directly proportional to the acceleration experienced by the accelerometer.

Linear acceleration signals cancel out of the accelerometer 77 in a manner similar to that of the accelerometer 50.

All three accelerometers will operate satisfactorily in a vehicle antiskid system. The accelerometer 50 is subject to inaccuracy if not confined to rotation in the same plane as that of the accelerometer. However, this normally is no problem in a vehicle system. Because of its simplicity, the accelerometer 31 of FIG. 2 is preferable, while the greater complexity and expense of the accelerometer 77 of FIG. 4 make it the least desirable.

Figure 5:
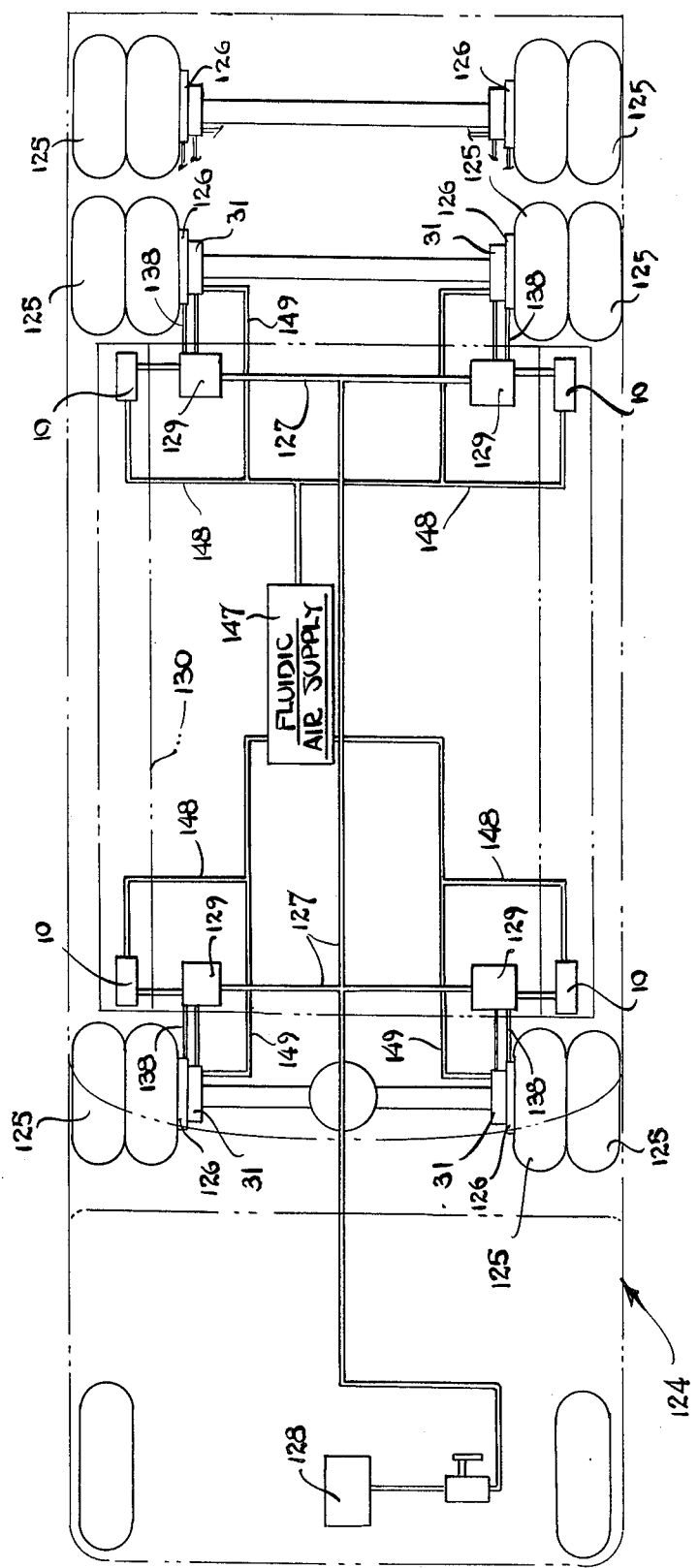
FIG. 5 is a plan view illustrating the components of an antiskid system associated with a vehicle having pneumatic brakes.

An antiskid system for controlling the application of braking forces in a pneumatic braking system is shown schematically in FIG. 5. The truck 124 illustrated has wheels 125 with brakes 126 of conventional design. Pressurized air for operation of the brakes 126 is conducted through lines 127 from a source 128. The operation of the brake pedal, through a conventional arrangement, determines the amount of pressure existing in the lines 127 for application of the brakes.

Instead of connecting directly to the brake actuators, as is characteristic ordinarily of truck braking systems, the lines 127 connect to control units 129, one of which is carried by the truck 124 adjacent each wheel, or set of wheels, which is to be prevented from skidding. In the event of an incipient skid at any wheel, the adjacent control unit governs the actual braking force to be applied to the wheel, irrespective of the pressure existing in the pneumatic supply line 127.

Also provided for each wheel 125 is a linear accelerometer, such as the accelerometer 10 of FIG. 1, suitably mounted on the axle or frame 130 so that its longitudinal axis is in the direction of the path of movement of the truck 124. An angular accelerometer, appropriately the angular accelerometer 31 of FIG. 2, is included for each wheel, arranged to rotate with the wheel 125. The linear and angular accelerometers provide signals which determine the operation of the control unit 129 and hence the application of the braking force in the event of a skid condition.

Figures 6, 7:
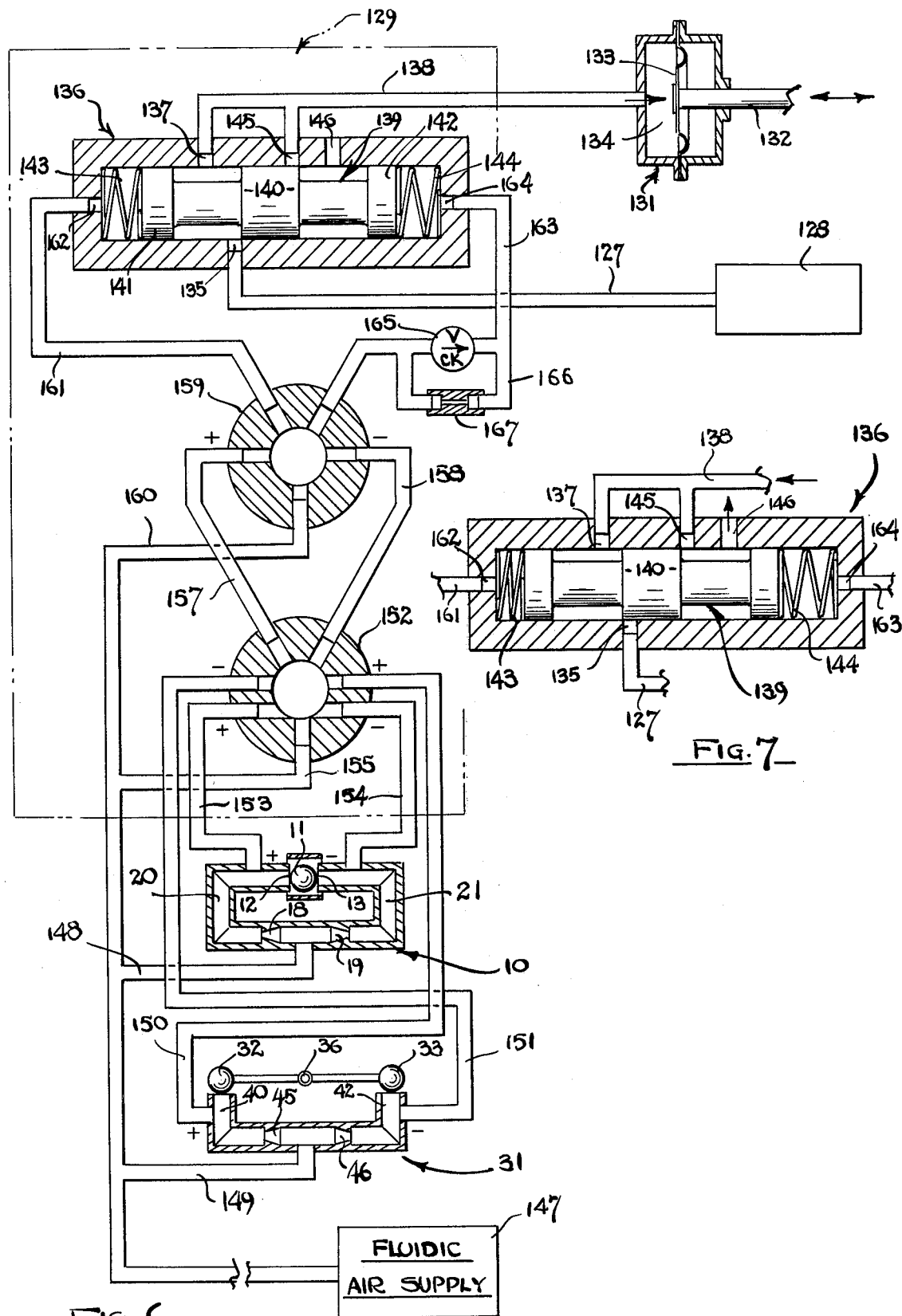
FIG. 6 is a schematic view of the part of the antiskid system of FIG. 5 used for each wheel of the vehicle.
FIG. 7 is a schematic view of a portion of the arrangement of FIG. 6, showing certain components in alternate positions.

The various components for each wheel of the antiskid system are shown in FIG. 6. The actuator 131 for applying the brakes at the wheel is conventional, including a rod 132 movable by a diaphragm 133 when pressurized air is received in the chamber 134 in back of the diaphragm. This movement is to the right, as the device is illustrated, and applies the brakes. When pressure in the chamber 134 is relieved, a spring return moves the rod 132 to the left and the brakes are released.

The brake pressure line 127 connects to the inlet 135 of a control valve 136 which is included in the brake control unit 129. The outlet 137 of the valve 136 connects through a line 138 to the chamber 134 of the actuator 131. Within the valve 136 is a spool 139 having a center lobe 140 and additional lobes 141 and 142 at its ends. Under normal conditions, when the wheel 125 has no tendency to skid, the spool 139 is centered by compression springs 143 and 144 which engage the end lobes 141 and 142. In this position, shown in FIG. 6, pressurized fluid from the line 127 is permitted to flow through the valve 136 to pressurize the chamber 134 via the line 138. This allows for operation of the brakes in the conventional manner.

However, if the valve spool should be moved to the left, as illustrated in FIG. 7, the center lobe 140 then will close off the valve inlet 135 so that pressure from the line 127 no longer can be transmitted through the valve 136 to the actuator 131. In this position of the valve, the lobe 140 uncovers a port 145 that then provides access to the valve chamber between the lobes 140 and 142. The line 138 to the actuator chamber 134 branches and connects to the valve port 145. An additional port 146 connects the space in the valve chamber between the lobes 140 and 142 to the atmosphere. With the valve spool 139 moved to the position of FIG. 7, pressure from the chamber 134 can vent to the atmosphere. This pressure bleeds through the line 138 and the valve port 145 to the valve chamber, where it exhausts through the port 146. Therefore, this position of the spool 139 causes release of the brakes of the vehicle by relieving the pressure within the brake actuator 131.

The linear accelerometer 10 receives its supply of operating fluid from a fluidic air supply 147 to which it connects by a line 148. An additional line 149 from the air supply 147 extends to the angular accelerometer 31. Assuming vehicle movement to the left, and counterclockwise rotation of the angular accelerometer 31, the output pressure lines 150 and 151 from the left- and right-hand sides, respectively, of the angular accelerometer 31 are connected to the opposite sides of a summing proportional amplifier 152. Conversely, lines 153 and 154 connect from the left- and right-hand sides of the linear accelerometer to the left- and right-hand sides, respectively, of the amplifier 152. In this way, the signal from the angular accelerometer 31 is subtracted from the signal of the linear accelerometer 10. A connection 155 supplies pressurized air from the source 128 as the operating fluid of the amplifier 152.

The outputs from the amplifier 152 are connected through lines 157 and 158 to the two sides of a digital fluid amplifier 159. This connects the left output of the amplifier 152 to the left-hand side of the amplifier 159, and the right output of the amplifier 152 to the right-hand side of the amplifier 159, as the components are illustrated. The digital amplifier 159 is supplied with operating fluid from a line 160 connected to the source of pressurized air 128. The left-hand output of the digital amplifier 159 is connected through a line 161 to a port 162 at the left-hand end of the control valve 136. The other output, from the right side of the amplifier 159, connects through a line 163 to the right-hand end port 164 of the control valve 136. A check valve 165 in the line 163 permits flow only away from the amplifier 159 and toward the port 164. The check valve 165 is bypassed by a line 166 in which there is a restricting orifice 167.

If the wheel 125 to which the angular accelerometer is connected should commence a skid, it will experience a rapid angular deceleration. Under these circumstances, the linear deceleration will be much less because the skidding wheel has a reduced sliding coefficient of friction with respect to the pavement, and will not effectively slow down the vehicle. The result is a wide disparity between the pressure signals of the angular and linear accelerometers. A sufficient difference between the signals from the angular accelerometer and the linear accelerometer produces a relatively high pressure in the output line 157 compared with that in the other output 158 of this amplifier. When this signal is applied to the control ports of the digital amplifier 159, it causes the latter amplifier to become saturated. The result is an increased pressure in the line 163, which, in turn, applies pressure through the inlet port 164 to the right-hand end of the spool 139. This drives the valve spool 139 to the left as the device is shown, shifting it from the position of FIG. 6 to that of FIG. 7. When that occurs, the pressure from the brake pressure line 127 is blocked by the center lobe 140 of the spool 139 and cannot reach the brake actuator 131. Simultaneously, the chamber 134 of the actuator 131 vents through the line 138 and the ports 145 and 146 to the atmosphere. This releases the brakes. Therefore, as soon as the wheel 125 tends to slide, its deceleration is sensed and used to release the brakes at that wheel.

When the wheel stops its skid, the signal from the angular accelerometer becomes reversed. This is because the wheel then accelerates rapidly from its rotationally locked condition to its normal angular velocity. The angular accelerometer's signal again greatly exceeds that of the linear accelerometer, but because it is reversed it will create a relatively high pressure in the line 158. This saturates the digital amplifier 159 on the opposite side, so that the pressure in the line 161 greatly exceeds that in the line 163. This biases the valve spool 139 to the right, back toward its original position. However, the check valve 165 will not permit reverse flow in the line 163 that connects to the right-hand end port 164. Instead, the fluid in the line 163 can only bleed relatively slowly through the restricted orifice 167 in the bypass 166. Consequently, while the brakes are released almost instantaneously upon the advent of a skid, the control valve spool 139 can be returned to its central neutral position only at a much slower rate as the fluid bleeds in the reverse direction through the line 163. Therefore, a period of time elapses before reapplication of braking pressure from the line 127 through the valve 136 to the brake actuator 131. Thus, there is an extremely rapid release of the brakes, but a more gradual reapplication of them.

If, when the brakes are reapplied, the wheel again should tend to lock, the cycle will be repeated as the saturated signal from the amplifier 159 will cause the release of the brakes as a consequence of the rapid deceleration of the wheel. The cycle is repeated over and over very rapidly, with sliding of the wheel always being precluded. A braking effect is realized each time the valve 136 is moved back to its neutral position so that the vehicle is slowed down as the skid control operates. The system may be constructed so as to cause complete or only partial release of the brakes as the control valve 136 is operated.

The system of FIG. 8 provides an antiskid arrangement for hydraulic brakes. The same source of control signals may be used as in the system for pneumatic brakes shown in FIG. 6. Thus, the linear accelerometer 10, the angular accelerometer 31, summing proportional amplifier 152 and digital amplifier 159 again are included and connected together as before.

The output of the digital amplifier 159 connects by lines 168 and 169 to the opposite ends of a hydraulic control valve 170. There is, in addition, an air control valve 136, which is in parallel with the valve 170, connected to the output of the amplifier 159 by lines 171 and 172. The valve 170 includes a spool 173 normally centered by compression springs 174 and 175 at its ends so that it assumes the position of FIG. 8. The ends of the lobes 176 and 177 of the spool 173 are engaged by the springs 174 and 175, and also may be reacted upon by air in the lines 168 and 169. However, the central part of the valve 170, between the lobes 176 and 177, is sealed from the ends and serves to control hydraulic fluid at inlet and outlet ports 178 and 179, respectively. A line 181 connects to the inlet port 178 and also to the master cylinder (not shown) of the vehicle's braking system. Hydraulic line 182 connects the outlet port 179 of the valve 170 with the wheel cylinder 183 of the vehicle's brakes. Opposed pistons 184 and 185 in the wheel cylinder 183 engage brake shoes 186 and 187. With the hydraulic control valve 170 in the neutral position shown in FIG. 8, the brakes operate in the normal manner, with pressurized hydraulic fluid from the line 181 passing through the valve 170 to the interior of the wheel cylinder 183 to force the pistons 184 and 185 outwardly. This, in turn, causes the brake shoes 186 and 187 to be applied to the brake drum for decelerating the vehicle.

High-pressure air from a source 188 connects through a line 189 to the inlet port 135 of the air control valve 136. When the spool 139 is in its central position, this air is conducted through the valve 136 into a line 190, which connects to a chamber 191 of an accumulator 192. Within the chamber 191, the high-pressure air reacts against a diaphragm 193, on the opposite side of which is a piston 194. The pressure of the air in the chamber 191 against the diaphragm 193 biases the piston 194 against the end wall 195 of the accumulator 192, or some other stop to limit the outward travel of the piston.

Hydraulic line 197 connects to the accumulator 192 at the wall 195 and also is connected to the hydraulic line 182 downstream of the valve 170. Consequently, the outer face of the accumulator piston 194 is subjected to hydraulic pressure equal to that in the line 181 from the master cylinder. However, the area of the piston 194 and the maximum pressure in the hydraulic system are correlated with the size of the diaphragm 193 and the air pressure in the chamber 191, so that the piston 194 normally is held in engagement with the end wall 195. Therefore, the piston 194 does not move under ordinary conditions and does not affect the application of pressurized hydraulic fluid to the brake cylinder 183.

The hydraulic control valve 170 is bypassed by a line 198 which interconnects this valve's inlet and outlet lines 181 and 182, respectively. A check valve 199 is in the line 198, permitting flow only from the line 182 toward the line 181. In normal braking, of course, the pressures are substantially equal in the lines 181 and 182 so that there is no flow through the bypass 198.

In the event of a skid, the amplifier 159 will become saturated in the manner described above in connection with the system of FIG. 6. This produces an increase in pressure in the line 169 compared with that in the line 168. Consequently, the spool 173 of the valve 170 is driven to the left, as the device is shown, causing the lobe 177 to close the inlet port 178. This blocks off the source of pressurized hydraulic fluid from access to the wheel cylinder 183.

Simultaneously, the amplifier 159 provides greater air pressure in the line 172 than in the line 171 and forces the spool 139 of the valve 136 to the left. This causes the center lobe 140 to close off the inlet port 135, shutting off the high-pressure air supply line 189. The central lobe 140 then also uncovers the port 145 which is connected to the line 190 that leads to the accumulator 192. This allows air to bleed from the chamber 191 through the line 190 and the port 145 into the interior of the valve 136 between the lobes 140 and 142. This air exhausts to the atmosphere through the vent port 146. Therefore, the air pressure against the diaphragm 193 is relieved. With the piston 194 of the accumulator 192 no longer being biased outwardly, it is moved inwardly by the hydraulic pressure as fluid from the wheel cylinder 183 can bleed through the line 182 and the line 197 to the accumulator. This releases the brakes. A stop 201 limits the travel of the piston 194 inwardly to the position shown in FIG. 9, where it accepts a predetermined quantity of hydraulic fluid sufficient to relieve the pressure in the wheel cylinder 183 so that the wheel no longer skids.

With the brakes released, the wheel accelerates back to substantially its original velocity. This causes the pressure signal of the angular accelerometer 31 to reverse, resulting also in a reversal in the relative pressures in the lines 168 and 169 and the lines 171 and 172. Thus, the control pressure from the amplifier 159 urges the spool 139 of the valve 136 back toward its central position. Similarly, the signal from the amplifier 159 biases the spool 173 of the valve 170 to the right toward its original centered position.

The return movement of both valve spools is regulated by restrictions against fluid flow in the reverse direction. In the line 169, this includes a check valve 202 allowing flow only toward the valve 170, together with a bypass 203 with a restricted orifice 204. Another check valve 205 is included in the line 172 so that full flow can go only toward the valve 136. Return flow must go via the bypass 206 in which is a restricted orifice 207. The restricted orifices 204 and 207 are proportioned such that the spool 139 of the valve 136 is allowed to return to its neutral position much more rapidly than is the spool 173 of the hydraulic control valve 170. Consequently, after the brakes have been released, the valve spool 139 is moved back to its center position at a time when the valve spool 173 still continues to block pressurized fluid from the line 181.

With the valve spool 139 centered, high-pressure air again is conducted through the line 189, the valve 136 and the line 190 to the chamber 191. As described above, the outward force exerted by the diaphragm 193 when the accumulator 192 is pressurized exceeds the inward force exerted by the hydraulic fluid on the piston 194. The air pressure in the accumulator 192 then causes the piston 194 to be returned to its outer position in engagement with the end wall 195. This, in turn, conducts the hydraulic fluid through the lines 197 and 182 to the wheel cylinder 183. Thus, the accumulator 192 reapplies the brakes.

The accumulator 192 will not apply the brakes at a pressure greater than that existing in the line 181. This is because a higher pressure in the lines 182 and 197 will bleed through the line 198 and the check valve 199 to equalize with the pressure in the line 181. Therefore, the brakes are reapplied only up to the maximum pressure being commanded by the driver at the time of the reapplication of the brakes.

If when the brakes are reapplied a skid again is detected, the cycle will repeat. That is to say, the saturated signal will cause the valve 136 to dump the air pressure from the accumulator 192, allowing the hydraulic fluid again to bleed from the wheel cylinder 183. The cycle continues, stopping the skid at the outset and slowing the vehicle until such time as the pressure from the master cylinder no longer will tend to lock the wheel. The system cycles very rapidly so that there is always complete control of the action of the wheel.

The foregoing detailed description is to be clearly understood as given by way of illustration and example only, the spirit and scope of this invention being limited solely by the appended claims.

I claim:
1. An accelerometer comprising
   first, second, third and fourth seismic masses,
   said masses being of equal size, shape and mass,
   a pair of chambers positioned one on either side of each of said masses,
   each of said chambers including an outlet opening facing the adjacent seismic masses,
   said outlet openings being opposed and axially aligned for each of said seismic masses,
   a source of pressurized fluid for providing fluid streams discharging through said outlet openings,
   whereby each of said masses is suspended between opposed fluid streams and is movable toward and away from the adjacent outlet openings,
   said fluid streams for said first and second seismic masses being substantially parallel,
   said fluid streams for said third and fourth seismic masses being substantially parallel and normal to the direction of said fluid streams for said first and second seismic masses,
said masses and chambers being in substantially a square pattern,
means for detecting the static pressure in each of said chambers for obtaining signals of pressure increase from relative movement of a seismic mass toward an outlet opening and of pressure decrease from relative movement of a seismic mass away from an outlet opening as a result of angular deceleration of said chambers, and means for adding said signals so as to obtain a composite output signal proportional to angular acceleration.

* * * * *